US012653100B2

(12) United States Patent (10) Patent No.: US 12,653,100 B2
Christiansen et al. (45) Date of Patent: Jun. 16, 2026

(54) RESIDUE SPREAD MONITORING

(71) Applicant: AGCO International GmbH, Neuhausen (CH)

(72) Inventors: Martin Peter Christiansen, Randers (DK); Ramon Buchaca Tarragona, Randers (DK); Morten Stigaard Laursen, Randers (DK); Kenneth Düring Jensen, Randers (DK); Thomas Smed Bojsen, Randers (DK)

(73) Assignee: AGCO International GmbH, Neuhausen (CH)

( * ) Notice: Subject to any disclaimer, the term of this patent is extended or adjusted under 35 U.S.C. 154(b) by 271 days.

(21) Appl. No.: 17/664,211

(22) Filed: May 19, 2022

(65) Prior Publication Data

US 2022/0369552 A1 Nov. 24, 2022

(30) Foreign Application Priority Data

May 19, 2021 (GB) ...................................... 2107125

(51) Int. Cl.
*A01D 41/127* (2006.01)
*A01B 79/00* (2006.01)
*A01D 41/12* (2006.01)
*G01S 13/58* (2006.01)
*G01S 13/88* (2006.01)
*G01S 17/88* (2006.01)
*G05B 19/4155* (2006.01)

(52) U.S. Cl.
CPC ....... *A01D 41/127* (2013.01); *A01D 41/1243* (2013.01); *G01S 17/88* (2013.01); *G05B 19/4155* (2013.01); *G05B 2219/31376* (2013.01)

(58) Field of Classification Search
None
See application file for complete search history.

(56) References Cited

U.S. PATENT DOCUMENTS

| | | | | |
|---|---|---|---|---|
| 2020/0344939 A1* | 11/2020 | Sporrer | ................. | A01B 33/16 |
| 2021/0015039 A1* | 1/2021 | Vandike | ................ | G06T 7/0002 |
| 2021/0026009 A1* | 1/2021 | Wodrich | .............. | G01S 15/931 |
| 2021/0034867 A1* | 2/2021 | Ferrari | ....................... | G06T 7/11 |
| 2021/0127573 A1* | 5/2021 | Mahieu | .............. | A01D 41/1243 |

FOREIGN PATENT DOCUMENTS

| | | |
|---|---|---|
| EP | 0685151 A1 | 12/1995 |
| EP | 1570726 A1 | 9/2005 |
| WO | 2018/162699 A1 | 9/2018 |

OTHER PUBLICATIONS

UK Intellectual Property Office, Search report for related UK Application No. GB2107125.3, dated Feb. 17, 2022.

* cited by examiner

*Primary Examiner* — Angela Y Ortiz
*Assistant Examiner* — Michael T Silva

(57) ABSTRACT

Systems and methods for monitoring the distribution of residue material from a spreader tool of an agricultural machine including a first sensor with a sensing region defining a first sensing boundary corresponding to a first direction with respect to the agricultural machine, a second sensor with a sensing region defining a second sensing boundary corresponding to a second direction with respect to the agricultural machine, and using the sensing data from the first and second sensors to determine a distribution of residue material associated with the spreader tool. One or more systems of the agricultural machine are then controlled based on the determined distribution.

13 Claims, 4 Drawing Sheets

RESIDUE SPREAD MONITORING

TECHNICAL FIELD

The present invention relates, in general, to systems and methods for monitoring residue spread from a harvesting machine.

BACKGROUND

Agricultural combines work to cut crop material from a field before separating the grain from the material other than grain (MOG) (referred to interchangeably as "residue") on board. Generally, the grain is transferred to a grain bin of the combine (where it may be temporarily stored) and the MOG is deposited back onto the field. A second operation may be performed to gather the deposited MOG, or the MOG may be used as a fertiliser for the soil in the field. In either case, it is important for the MOG to be distributed evenly during deposition, in order to ensure an efficient second harvesting operation (e.g. bailing of the MOG) or to ensure effective fertilisation of the soil. When residue is unevenly distributed over a field, not only are exposed areas at risk for erosion, but inconsistencies in soil temperatures and moisture also may cause uneven plant emergence the following year, hurting yield. Ideally, residue should be spread consistently and managed to promote uniform rapid warming and drying in the spring for earlier planting and sufficient seed germination. It is also important not to spread MOG or residue into standing crop adjacent to the machine—i.e. the crop to be harvested on the next pass by the machine—as spreading into standing crop may result in the same area being spread twice causing an unwanted build-up of residue in a given area, again leading to uniformity issues.

To control the distribution of the MOG, known combines include spreader tools which can include deflectors/steering vanes, rotors or the like which are controllable by an operator of the combine. Generally, this is a manual process and the operator must observe the distribution of the MOG during operation and make any necessary adjustments to the spreader tool manually. The distribution of the MOG can be affected by numerous operating conditions, including wind speed, water content of the material, gradient of the field, etc. Accordingly, observing and adjusting the spreader tool manually can be relatively complex and time consuming, especially where the operating conditions vary across the area to be harvested.

In an attempt to address this problem it is known to utilise sensors, e.g. wind direction sensors, ultrasonic sensors, cameras and the like operable to infer or monitor the distribution of the MOG in real time. In some instances, information relating to the observed distribution may be relayed to the operator of the combine (e.g. through a user interface within the operator cab) who may use this information to adjust operation of the spreader tool. In further solutions, control of the spreader tool has been at least partly automated based on data from such sensors, for example by controlling the direction of one or more steering vanes/ deflectors in an attempt to account for wind direction. However, such systems are relatively complex and no complete solution has been realised.

It would be advantageous to improve upon these known systems such that the distribution of material from an agricultural machine can be monitored and optionally controlled more effectively and efficiently.

SUMMARY OF THE INVENTION

In an aspect of the invention there is provided a system for monitoring the distribution of residue material from a spreader tool of an agricultural machine, the system comprising: a first sensor having a sensing region defining a first sensing boundary corresponding to a first direction with respect to the agricultural machine; a second sensor having a sensing region defining a second sensing boundary corresponding to a second direction with respect to the agricultural machine; and one or more controllers, configured to: receive data from the first sensor indicative of a measure of residue material crossing the first sensing boundary; receive data from the second sensor indicative of a measure of residue material crossing the second sensing boundary; determine, from the data received from the first and second sensors, a distribution of residue material associated with the spreader tool; and output one or more control signals for controlling operation of one or more systems of the agricultural machine in dependence on the determined distribution.

Advantageously, the arrangement of the present invention allows for the distribution of residue distributed by the spreader tool to be monitored in at least two directions with respect to the agricultural machine.

The first and/or second sensor may have a two-dimensional sensing region. In such embodiments, the first and/or second sensing boundary may comprise a two-dimensional sensing plane.

The first and/or second sensing boundary may be orientated substantially vertically with respect to the ground.

The first and/or second sensing boundary may be parallel to the direction of travel of the agricultural machine, in use. The first and/or second sensing boundary may correspond to an edge of the agricultural machine, or a component thereof. For example, the first sensing boundary may correspond to a left hand edge of the agricultural machine, and the second sensing boundary may correspond to a right hand edge of the agricultural machine. The first and second sensing boundaries may be separated by a distance substantially equal to the width of the agricultural machine, or a component thereof (e.g. a header for a combine harvester). Advantageously, the system of the present invention may be operable to determine a distribution of residue material outside of the width of the agricultural machine.

The first and/or second sensing boundary may be positioned/be used to define a desired maximum lateral distance for material to be spread to. For example, the first and/or second sensing boundary may be substantially parallel to the direction of travel of the agricultural machine and correspond to left/right hand edges thereof, defining a maximum lateral distance for residue material spread corresponding substantially to the width of the agricultural machine. The system may be configured to determine a measure of residue material crossing the first and/or second sensing boundary. The system may be configured to control operation of the spreader tool to reduce a maximum lateral distance material is spread in a direction corresponding to the first and/or second sensing boundary in dependence on a determination that material is crossing the relevant sensing boundary. Where it is determined that no material is crossing the first and/or second sensing boundary, the system may be configured to control operational of the spreader tool to increase the maximum lateral distance material is spread in a direction corresponding to the first and/or second sensing boundary up to the point where it is determined, i.e. from the sensor data from the first and/or second sensors, that material is crossing the respective boundary. In this way, the system may be configured to control the distribution of residue material such that it is contained within a central spreading region corresponding substantially to the width of the machine.

In other embodiments, the first and/or second sensing boundary may be angled with respect to the direction of travel of the agricultural machine. In embodiments, the first and second sensing boundaries may be angled such that residue material from the spreader tool is incident on the boundary substantially at right angles thereto. The first and second sensing boundaries may intersect at a point or line of intersection. The point or line of intersection may be positioned behind the agricultural machine (with respect to the direction of travel of the agricultural machine, in use). The point or line of intersection may be positioned substantially centrally with respect to a lateral axis of the agricultural machine.

The first and/or second sensor may comprise a transceiver type sensor, having a transmitting component for transmitting a measurement signal and a receiving component for receiving reflected measurement signals. The first and/or second sensor may comprise a RADAR sensor, LIDAR sensor, infrared sensor, or the like, for example. In presently preferred embodiments the first and second sensors are two-dimensional LIDAR sensors, each having a two-dimensional sensing region.

The first sensing boundary may correspond to a first side of the agricultural machine. The second sensing boundary may correspond to a second side of the agricultural machine. For example, the first sensing boundary may correspond to a left hand side of the agricultural machine and the second sensing boundary may correspond to a right hand side of the agricultural machine. In such embodiments, the system may be operable to monitor a relative distribution of residue from the spreader tool, e.g. a relative measure (e.g. volume) of residue being spread from the spreader tool in a direction corresponding to the first and second sides of the agricultural machine. The relative measure may be determined from the measure of residue material crossing the first and second sensing boundaries. For example, the measure of residue material crossing the first and/or second sensing boundaries may comprise a measure of the volume of residue material crossing the sensing boundary/ies. The measure of residue material crossing the first and/or second sensing boundaries may comprise a count of individual crossings of residue material crossing the sensing boundary/ies.

The one or more controllers may be configured to determine a location of the first and/or second sensing boundaries at which residue material has crossed the boundary. The one or more controllers may be configured to determine or infer a location within the environment of the agricultural machine at which said residue material may lie following the spreading operation—for example, the position of the residue material on a ground surface, with respect to the agricultural machine or with respect to a local or global positioning system. This may be possible using one or more of: a known location of the spreader tool on the agricultural machine, an operational speed of the spreader tool, an operational speed of the agricultural machine (e.g. a forward speed of the machine), a flow rate of material through to the spreader tool or other sub-systems of the agricultural machine or environmental factors, including weather conditions (e.g. wind speed and direction). In this way, the system may be configured to monitor a distribution of residue material beyond the first and/or second sensing boundaries.

In embodiments, the one or more systems of the agricultural machine controllable by the system of the present aspect may include a user interface, e.g. a display means, which may provide information, for example to an operator of the agricultural machine corresponding to the observed residue material distribution. This may comprise visually illustrating the observed distribution, or providing an audible or visual indicator to the operator of the observed residue distribution. For example, the user interface may be operable to or be instructed by the one or more controllers (e.g. through control signals output by the one or more controllers) to display or otherwise indicate an error state when the observed residue distribution differs from a predetermined state (which may be user selected). For example, an operator may select a desired relative distribution of the residue material, e.g. 50/50 split between the left hand side and right hand side of the agricultural machine, and the system may be configured to output an indicator if the observed distribution differs from the desired distribution, or differs from the desired distribution by a predetermined amount.

In further embodiments, the system may be operable to control one or more operating parameters of the agricultural machine in dependence on the observed residue material distribution. The one or more operating parameters may include operating parameters of the spreader tool.

The spreader tool may include a steering mechanism, and the system may be operable to control one or more operating parameters of the steering mechanism to control the distribution of residue material from the spreader tool. For example, the steering mechanism may include one or more steering vanes or deflectors, and the system may be operable to control a position (e.g. a rotational position) of the steering vane(s) or deflector(s) to control a direction of deflection therefrom.

The steering mechanism may include a first steering unit for controlling the distribution of residue material from the spreader tool in the first direction. The steering mechanism may include a second steering unit for controlling distribution of residue material from the spreader tool in the second direction. The steering mechanism may include one or more rotors operable to provide a motive force for the residue material through the steering mechanism. For example, the rotor(s) may provide or induce an airflow through the steering mechanism, or may be operable to provide the motive force through contacting the residue material with one or more moveable elements of the rotor—e.g. a rotatable element. The steering mechanism may comprise a first steering unit in the form of a first rotor for controlling movement of residue material through and out of the steering mechanism in generally the first direction and/or a second steering unit in the form of a second rotor for controlling movement of residue material through and out of the steering mechanism in generally the second direction. The system may be operable to control operation of the first and/or second rotor (e.g. a first operating parameter of the spreader tool may relate to the operation of the first rotor and a second operating parameter of the spreader tool may relate to the operation of the second rotor), for example, by controlling a rotational speed of the first and/or second rotor to control distribution of residue material in the first and/or second directions. It will be appreciated that the speed at which the rotors operate may be used to control the extent to which the residue material is distributed from the spreader tool. Accordingly, the system may be operable to control a speed of the first and/or second rotors (e.g. a rotational speed of a rotatable element of the rotor(s). For example, the system may be operable to increase the speed of the first rotor to increase a distance at which the residue material is distributed in the first direction. Likewise, the system may be operable to increase the speed of the second rotor to increase a distance at which the residue material is distributed in the second direction. The system may be operable to decrease the speed of the first and/or second rotor to decrease a distance at which the residue material is distributed in the first/second direction.

Where present, the first and/or second rotors may be provided in combination with fixed or moveable steering vane(s)/deflector(s).

The system may be operable to control the first steering unit and the second steering unit independently, such that the distribution of residue material from the spreader tool in the first direction and the second direction may be controlled generally independently from one another.

In a further aspect of the invention there is provided a control system for monitoring the distribution of residue material from a spreader tool of an agricultural machine, the control system comprising one or more controllers, and being configured to: receive data from a first sensor indicative of a measure of residue material crossing a first sensing boundary associated with the first sensor; receive data from a second sensor indicative of a measure of residue material crossing a second sensing boundary associated with the second sensor; determine, from the data received from the first and second sensors, a distribution of residue material associated with the spreader tool; and output one or more control signals for controlling operation of one or more systems of the agricultural machine in dependence on the determined distribution.

The one or more controllers may collectively comprise an input (e.g. an electronic input) for receiving one or more input signals from the first and/or second sensors. The one or more controllers may collectively comprise one or more processors (e.g. electronic processors) operable to execute computer readable instructions for controlling operation of the control system, for example to determine the distribution of residue material. The one or more processors may be operable to generate one or more control signals for controlling operation of the one or more systems. The one or more controllers may collectively comprise an output (e.g. an electronic output) for outputting the one or more control signals.

The first sensing boundary may correspond to a first side of the agricultural machine. The second sensing boundary may correspond to a second side of the agricultural machine. For example, the first sensing boundary may correspond to a left hand side of the agricultural machine and the second sensing boundary may correspond to a right hand side of the agricultural machine. In such embodiments, the control system, or one or more controllers thereof, may be operable to monitor a relative distribution of residue from the spreader tool, e.g. a relative measure (e.g. volume) of residue being spread from the spreader tool in a direction corresponding to the first and second sides of the agricultural machine. The relative measure may be determined from the measure of residue material crossing the first and second sensing boundaries. For example, the measure of residue material crossing the first and/or second sensing boundaries may comprise a measure of the volume of residue material crossing the sensing boundary/ies. The measure of residue material crossing the first and/or second sensing boundaries may comprise a count of individual crossings of residue material crossing the sensing boundary/ies.

The one or more controllers may be configured to determine a location of the first and/or second sensing boundaries at which residue material has crossed the boundary. The one or more controllers may be configured to determine or infer a location within the environment of the agricultural machine at which said residue material may lie following the spreading operation—for example, the position of the residue material on a ground surface, with respect to the agricultural machine or with respect to a local or global positioning system. This may be possible using one or more of: a known location of the spreader tool on the agricultural machine, an operational speed of the spreader tool, an operational speed of the agricultural machine (e.g. a forward speed of the machine), or environmental factors, including weather conditions (e.g. wind speed and direction). In this way, the control system may be configured to monitor a distribution of residue material beyond the first and/or second sensing boundaries.

In embodiments, the one or more systems of the agricultural machine controllable by the control system of the present aspect may include a user interface, e.g. a display means, which may provide information, for example to an operator of the agricultural machine corresponding to the observed residue material distribution. This may comprise visually illustrating the observed distribution, or providing an audible or visual indicator to the operator of the observed residue distribution. For example, the user interface may be operable to or be instructed by the one or more controllers to display or otherwise indicate an error state when the observed residue distribution differs from a predetermined state (which may be user selected). For example, an operator may select a desired relative distribution of the residue material, e.g. 50/50 split between the left hand side and right hand side of the agricultural machine, and the system may be configured to output an indicator if the observed distribution differs from the desired distribution, or differs from the desired distribution by a predetermined amount.

In further embodiments, the control system may be operable to control one or more operating parameters of the agricultural machine in dependence on the observed residue material distribution. The one or more operating parameters may include operating parameters of the spreader tool.

The spreader tool may include a steering mechanism, and the control system may be operable to control one or more operating parameters of the steering mechanism to control the distribution of residue material from the spreader tool. For example, the steering mechanism may include one or more steering vanes or deflectors, and the system may be operable to control a position (e.g. a rotational position) of the steering vane(s) or deflector(s) to control a direction of deflection therefrom.

The steering mechanism may include a first steering unit for controlling the distribution of residue material from the spreader tool in the first direction. The steering mechanism may include a second steering unit for controlling distribution of residue material from the spreader tool in the second direction. The steering mechanism may include one or more rotors operable to provide a motive force for the residue material through the steering mechanism. The steering mechanism may comprise a first steering unit in the form of a first rotor for controlling movement of residue material through and out of the steering mechanism in generally the first direction and/or a second steering unit in the form of a second rotor for controlling movement of residue material through and out of the steering mechanism in generally the second direction. The control system may be operable to control operation of the first and/or second rotor (e.g. a first operating parameter of the spreader tool may relate to the operation of the first rotor and a second operating parameter of the spreader tool may relate to the operation of the second rotor), for example, by controlling a rotational speed of the first and/or second rotor to control distribution of residue material in the first and/or second directions. The control system may be operable to control a speed of the first and/or second rotors (e.g. a rotational speed of a rotatable element of the rotor(s). For example, the system may be operable to increase the speed of the first rotor to increase a distance at which the residue material is distributed in the first direction. Likewise, the control system may be operable to increase the speed of the second rotor to increase a distance at which the residue material is distributed in the second direction. The system may be operable to decrease the speed of the first and/or second rotor to decrease a distance at which the residue material is distributed in the first/second direction.

The control system may be operable to control the first steering unit and the second steering unit independently, such that the distribution of residue material from the spreader tool in the first direction and the second direction may be controlled generally independently from one another.

According to a further aspect of the invention there is provided an agricultural machine comprising the system or control system as described herein. Optionally, the agricultural machine comprises a harvester, such as a combine harvester or forage harvester, for example.

In a further aspect of the invention there is provided a method of monitoring the distribution of residue material from a spreader tool of an agricultural machine, the method comprising: receiving data from a first sensor indicative of a measure of residue material crossing a first sensing boundary associated with the first sensor; receiving data from a second sensor indicative of a measure of residue material crossing a second sensing boundary associated with the second sensor; determining, from the data received from the first and second sensors, a distribution of residue material associated with the spreader tool; and controlling operation of one or more systems of the agricultural machine in dependence on the determined distribution.

The method may comprise monitoring a relative distribution of residue from the spreader tool, e.g. a relative measure (e.g. volume) of residue being spread from the spreader tool in a direction corresponding to the first and second sides of the agricultural machine. The relative measure may be determined from the measure of residue material crossing the first and second sensing boundaries. For example, the measure of residue material crossing the first and/or second sensing boundaries may comprise a measure of the volume of residue material crossing the sensing boundary/ies. The measure of residue material crossing the first and/or second sensing boundaries may comprise a count of individual crossings of residue material crossing the sensing boundary/ies.

The method may comprise determining a location of the first and/or second sensing boundaries at which residue material has crossed the boundary. The method may comprise determining or inferring a location within the environment of the agricultural machine at which said residue material may lie following the spreading operation—for example, the position of the residue material on a ground surface, with respect to the agricultural machine or with respect to a local or global positioning system. This may be possible using one or more of: a known location of the spreader tool on the agricultural machine, an operational speed of the spreader tool, an operational speed of the agricultural machine (e.g. a forward speed of the machine), or environmental factors, including weather conditions (e.g.

wind speed and direction). In this way, a distribution of residue material beyond the first and/or second sensing boundaries.

In embodiments, the method may comprise using a user interface, e.g. a display means, to provide information, for example to an operator of the agricultural machine, corresponding to the observed residue material distribution. This may comprise visually illustrating the observed distribution, or providing an audible or visual indicator to the operator of the observed residue distribution. For example, the user interface may be used to display or otherwise indicate an error state when the observed residue distribution differs from a predetermined state (which may be user selected). For example, an operator may select a desired relative distribution of the residue material, e.g. 50/50 split between the left hand side and right hand side of the agricultural machine, and an indicator may be output if the observed distribution differs from the desired distribution, or differs from the desired distribution by a predetermined amount.

The method may comprise controlling one or more operating parameters of the agricultural machine in dependence on the observed residue material distribution. The one or more operating parameters may include operating parameters of the spreader tool. The spreader tool may include a steering mechanism, and one or more operating parameters of the steering mechanism may be controlled to control the distribution of residue material from the spreader tool. For example, the steering mechanism may include one or more steering vanes or deflectors, and a position (e.g. a rotational position) of the steering vane(s) or deflector(s) may be controlled to control a direction of deflection therefrom.

The method may comprise controlling operation of the first and/or second rotor (e.g. a first operating parameter of the spreader tool may relate to the operation of the first rotor and a second operating parameter of the spreader tool may relate to the operation of the second rotor), for example, by controlling a rotational speed of the first and/or second rotor to control distribution of residue material in the first and/or second directions. A speed of the first and/or second rotors may be controlled (e.g. a rotational speed of a rotatable element of the rotor(s). For example, increasing the speed of the first rotor may increase a distance at which the residue material is distributed in the first direction. Likewise, increasing the speed of the second rotor may increase a distance at which the residue material is distributed in the second direction. The method may comprise decreasing the speed of the first and/or second rotor to decrease a distance at which the residue material is distributed in the first/second direction.

The first steering unit and the second steering unit may be controlled independently, such that the distribution of residue material from the spreader tool in the first direction and the second direction may be controlled generally independently from one another.

In a further aspect of the invention there is provided computer software comprising computer readable instructions which, when executed by one or more electronic processors, causes performance of a method as described herein.

A further aspect of the invention provides a computer readable storage medium comprising the computer software of the preceding aspect of the invention. Optionally, the storage medium comprises a non-transitory computer readable storage medium.

Within the scope of this application it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

One or more embodiments of the invention will now be described, by way of example only, with reference to the accompanying drawings, in which.

DETAILED DESCRIPTION

Figure 1:
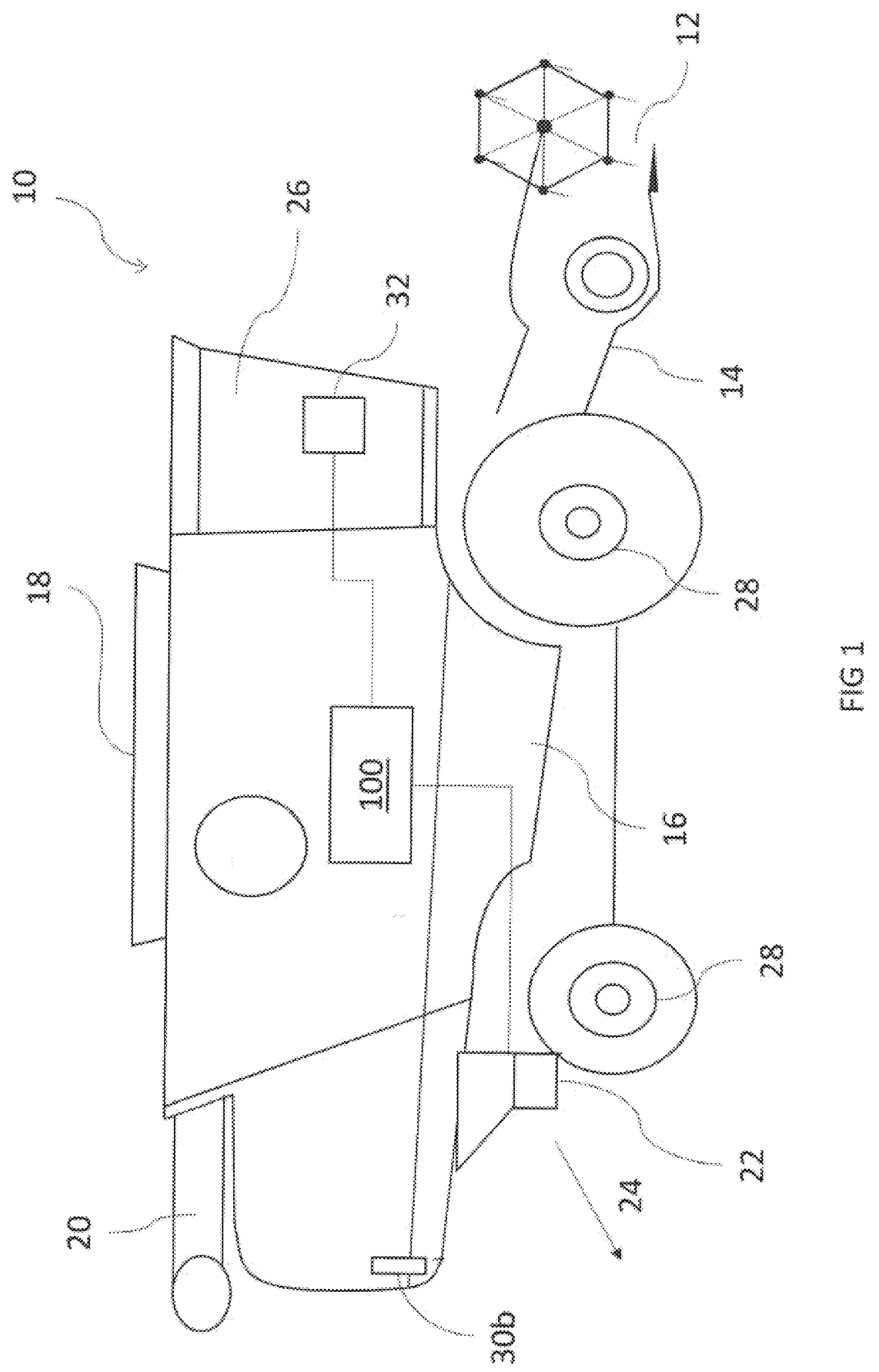
FIG. 1 is a schematic side cross-sectional view of an agricultural harvester embodying aspects of the invention.

FIG. 1 illustrates an agricultural machine, and specifically a combine 10, embodying aspects of the present invention.

The combine 10 is coupled to a header 12 which is operable, in use, to cut and gather a strip of crop material as the combine 10 is driven across a field/area to be harvested during a harvesting operation. A conveyor section 14 conveys the cut crop material from the header 12 into a crop processing apparatus 16 operable to separate grain and non-grain (i.e. material other than grain (MOG) or residue material (used interchangeably herein)) as will be appreciated. It is noted here that apparatus for separating grain and non-grain material are well-known in the art and the present invention is not limited in this sense. The skilled person will appreciate that numerous different configurations for the crop processing apparatus may be used as appropriate. Clean grain separated from the cut crop material is collected in a grain bin 18, which may be periodically emptied, e.g. into a collection vehicle, storage container, etc. utilising unloading auger 20. The remaining non-grain material (MOG)/residue material is separately moved to a spreader tool 22 which is operable in use to eject the non-grain material or MOG from the rear of the combine 10 and onto the ground. In FIG. 1, this is represented by arrow 24 which illustrates the MOG being ejected rearwards from the combine 10. It will be appreciated that in some embodiments the combine 10 may also include a chopper tool positioned, for example, between the crop processing apparatus 16 and the spreader tool 22 and operable, in use, to cut the residue material before it is spread by the spreader tool 22.

The combine 10 also typically includes, amongst other features, an operator cab 26, wheels 28, engine (not shown) and a user interface 32.

As will be discussed in detail herein, the combine 10 additionally includes first and second sensors in the form of a first LIDAR unit 30a (not seen in FIG. 1) and a second LIDAR unit 30b. As will be appreciated, the first and second LIDAR units 30a, 30b are transceiver type sensing units, having a transmitter component for transmitting measurement signals, and a receiver component for receiving reflected measurement signals from objects within the environment of the combine 10. The first and second LIDAR units 30a, 30b are used, by a control system 100 of the combine, to determine a distribution of residue material associated with the spreader tool 22 in the manner discussed herein.

Figure 2:
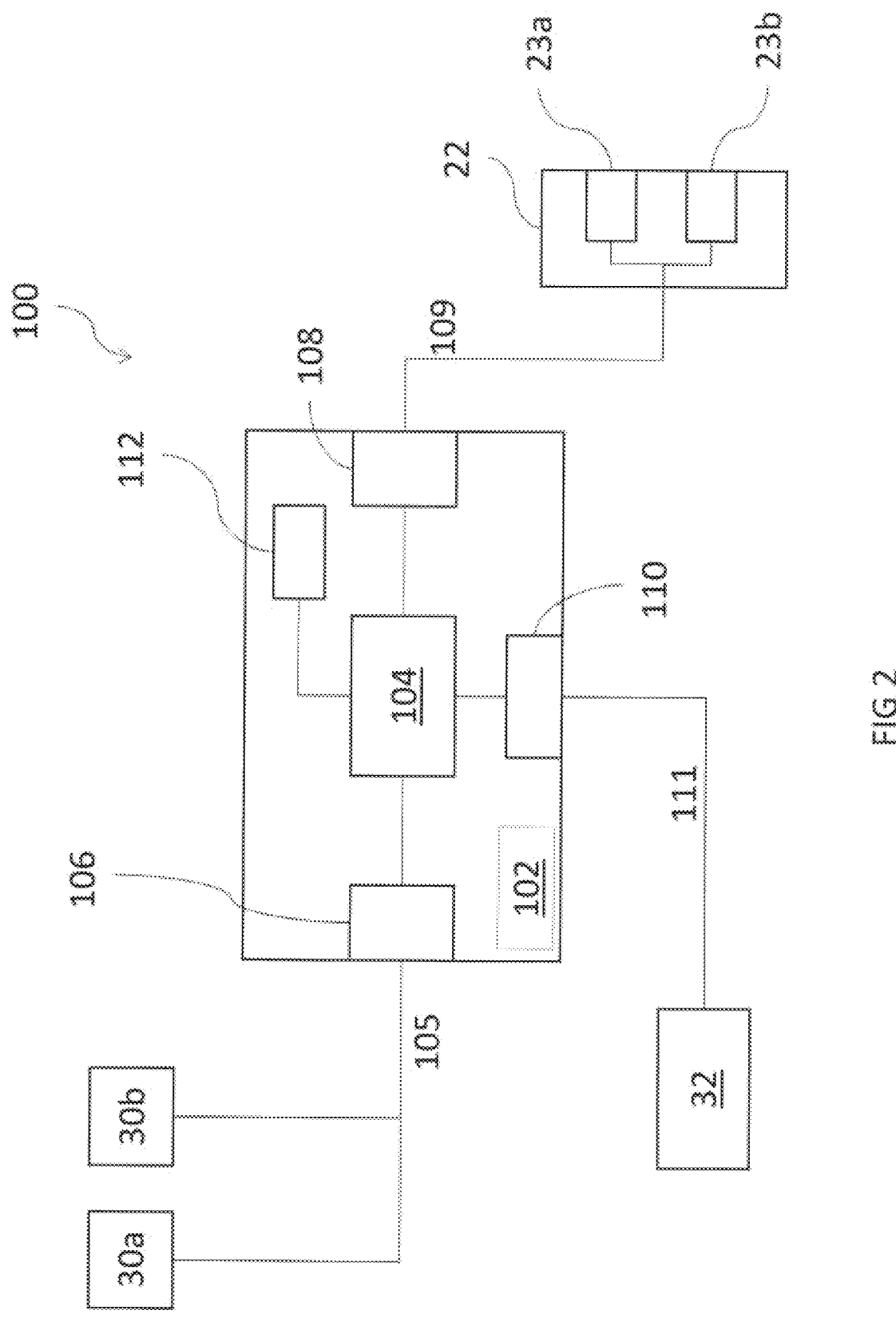
FIG. 2 is a schematic view of an embodiment of a control system of the invention.

FIG. 2 illustrates control system 100 further. As shown, control system 100 comprises a controller 102 having an electronic processor 104, an electronic input 106 and electronic outputs 108, 110. The processor 104 is operable to access a memory 112 of the controller 102 and execute instructions stored therein to perform the steps and functionality of the present invention, for example to output control signals 109 via the output 108 for controlling operation of the spreader tool 22, and more specifically first and second steering units of the spreader tool 22, here in the form of a first rotor 23a and a second rotor 23b, for controlling the distribution of residue material ejected from the spreader tool 22, or for controlling the user interface 32, for example to provide an image to an operator of the combine 10 illustrative of the observed residue material distribution.

The processor 104 is operable to receive sensor data via input 106 which, in the illustrated embodiment, takes the form of input signals 105 received from LIDAR units 30a, 30b. As described in detail herein, each of the LIDAR units 30a, 30b has respective sensing regions defining respective sensing boundaries 31a, 31b, with the sensor data received from the first LIDAR unit 30a is indicative of a measure of residue material crossing the first sensing boundary 31a associated with a first side of the combine 10, and data from the second LIDAR unit 30b being indicative of a measure of residue material crossing the second sensing boundary 31b associated with a second side of the combine 10. From this, the processor 104 is operable to determine a residue material distribution in the manner described herein.

Output 110 is operably coupled to the user interface 32 of the combine 10. Here, the control system 100 is operable to control operation of the user interface 32, e.g. through output of control signals 111 in order to display operational data to an operator of the combine 10 relating to the operation of the control system 100. Specifically, the control system 100 may be operable to control the user interface 32 to display to the operator a graphical representation of the residue material distribution from the spreader tool 22 as determined by processor 104, image data obtained from a camera on the combine 10, or other useful information. The user interface 32 may also be operable to receive a user input from the operator, and in such instances the output 110 may act as an input for receiving that user input at the processor 104. The user input may relate to a requested or desired distribution of residue material, for example, made by the operator of the combine 10.

FIGS. 3 to 6 further illustrate the operational use of aspects of the invention.

Figures 3, 4:
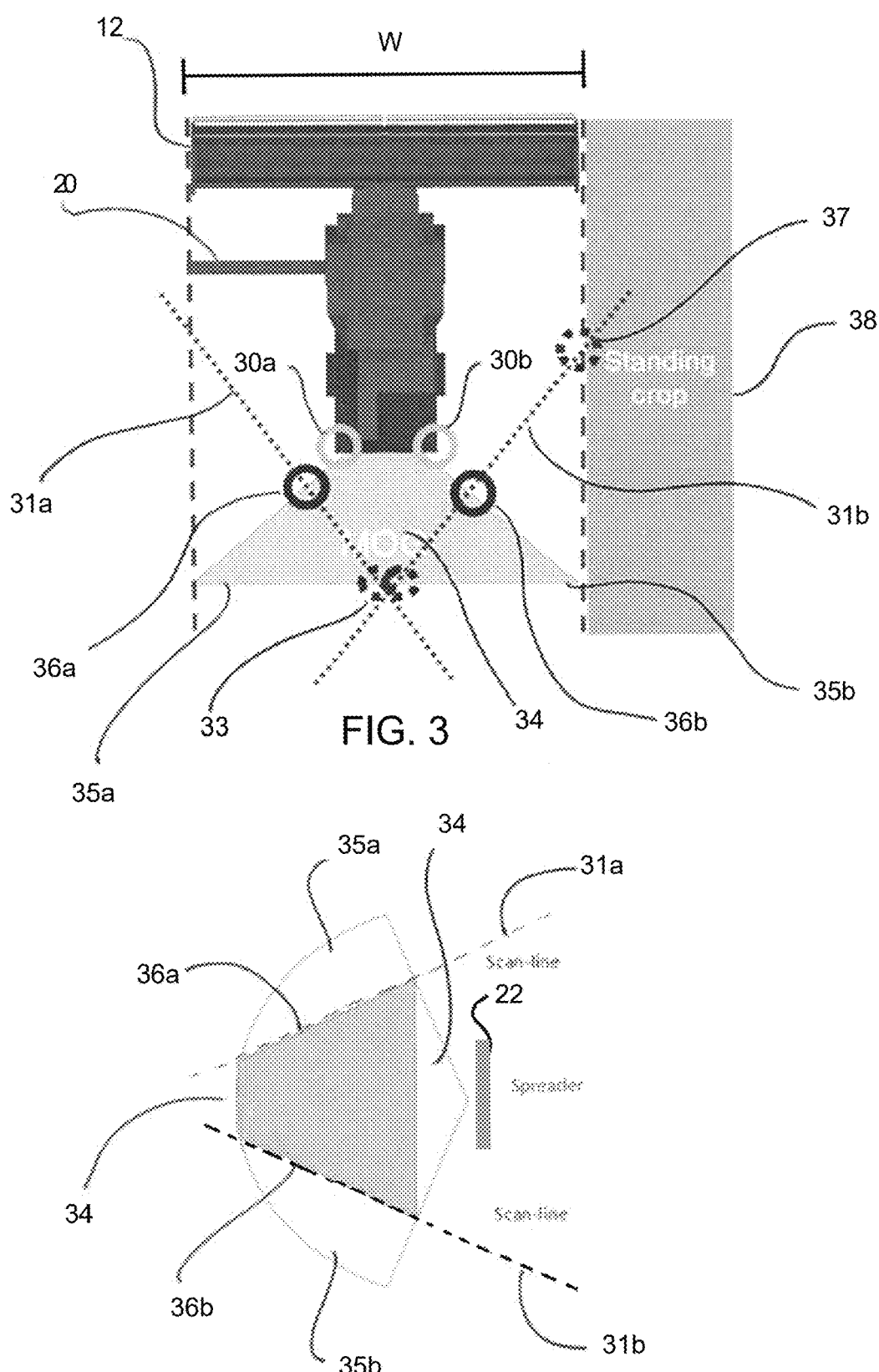
FIG. 3 is a schematic top down view of a harvester embodying aspects of the invention.
FIG. 4 illustrates a typical residue material distribution and components of an embodiment of a system of the invention for monitoring the distribution.

FIGS. 3 and 4, specifically, relate to a first embodiment of a combine 10 embodying a system of the invention.

As shown, combine 10 includes a header 12 having width W, an unloading auger 20 and first and second LIDAR units 30a, 30b mounted on the rear and either side of the combine 10. Specifically, LIDAR unit 30a is mounted on a left-rear side of the combine 10 and the second LIDAR unit 30b is mounted on a right-rear side of the combine 10 in the orientation shown in FIG. 3.

The first LIDAR unit 30a has a first sensing region defining a two-dimensional sensing plane, hereinafter referred to as the first sensing boundary 31a. Similarly, the second LIDAR unit 30*b* has a second sensing region defining a two-dimensional sensing plane, hereinafter referred to as the second sensing boundary 31*b*. The first and second sensing boundaries 31*a*, 31*b* are orientated substantially vertically with respect to the ground but are angled with respect to one another, meeting at a point/line of intersection 33 at a location substantially centrally behind the combine 10, defining a central measurement region 34. Advantageously, having the first and second sensing boundaries 31*a*, 31*b* angled in the manner shown in FIG. 3, specifically, results in residue material ejected by the spreader tool 22 is incident on the boundary/ies 31*a*, 31*b* at substantially right angles thereto, as exemplified by intersection points 36*a*, 36*b* in FIG. 3.

The measurement region of the arrangement further includes a left measurement region 35*a* delineated by the first sensing boundary 31*a* and a right measurement region 35*b* delineated by the second sensing boundary 31*b*. Utilising the LIDAR units 30*a*, 30*b* and the data obtained therefrom the control system 100, and specifically processor 104, is operable to determine a measure of the residue material passing through the boundaries 31*a*, 31*b* and into the left and right measurement regions 35*a*. 35*b*. From this, it is possible to determine a distribution of residue material from the spreader tool 22. For example, the processor 104 may be configured to monitor an amount or volume of residue material passing through each of the first and second sensing boundaries 31*a*, 31*b*, and determine if the residue material distribution is skewed left or right, or is substantially uniform based on this measurement. Specifically, if a higher volume of material is determined to be passing through the first sensing boundary 31*a* compared with the second sensing boundary 31*b*, then it is possible to infer that the distribution of residue material is skewed to the left (in the orientation shown in FIG. 3) and appropriate action may be taken based thereon. For example, control signals 109 may be output via electronic output 108 to spreader tool 22, and specifically to first and second rotors 23*a*, 23*b* to adjust operation thereof, e.g. to reduce the speed of the left rotor 23*a* and/or increase the speed of the right rotor 23*b*, or in some instances adjust the orientation of one or more steering vanes (not shown) to reduce the skewedness of the residue distribution profile—essentially by increasing the volume of material ejected generally in the direction of the second sensing boundary 31*b* and/or reduce the volume of material ejected generally in the direction of the first sensing boundary 31*a*.

In further embodiments, a visualisation of the observed residue material distribution may be displayed to an operator of the combine 10 via user interface 32. Specifically, the processor 104 may cause output of control signals 111 from electronic output 110 for controlling operation of the user interface 32. This may include a graphical visualisation of the distribution itself, and/or warning or error messages which may, for example include suggested actions to correct/adjust the residue material distribution.

FIG. 3 additionally illustrates how the arrangement of the present invention may be used to identify the position of the edge of standing crop 38 adjacent to the combine 10 as the combine 10 is operating in the field, here identified by the position of an intersection point 37 in the sensor data from LIDAR unit 30*b*. Whilst this may be inferred from the width W of the header 12, it is useful to position the standing crop boundary within the sensor data from LIDAR unit 30*b* and hence relative to the observed residue distribution. As is described herein, it is preferable for residue material not to be spread into adjacent standing crop, but to be ejected to a maximum lateral distance which coincides with the standing crop boundary. Accordingly, control over the spreader tool 22 based on information of the position of the standing crop boundary may be advantageously provided.

Figure 5:
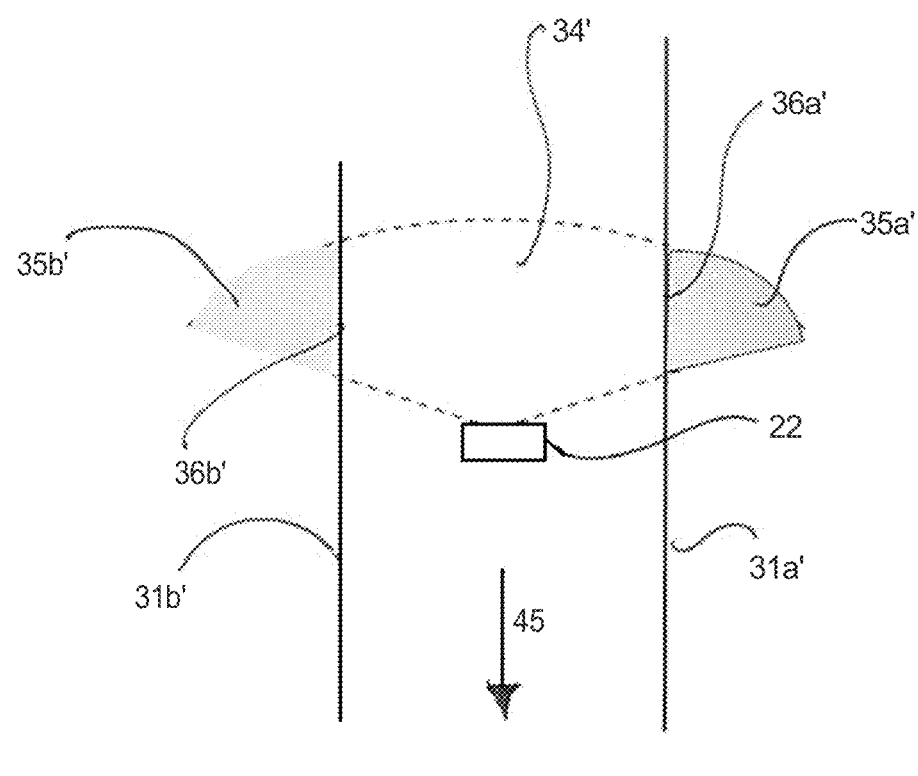
FIG. 5 illustrates a second typical residue material distribution and components of a further embodiment of a system of the invention for monitoring the distribution.

FIG. 5 illustrates a further embodiment of the invention. The system illustrated by this Figure is essentially equivalent to that described hereinabove, with first and second sensors in the form of LIDAR units (not shown) providing respective first and second sensing boundaries 31*a* and 31*b*', defining a central measurement region 34', left measurement region 35*a* delineated by the first sensing boundary 31*a*, right measurement region 35*b*' delineated by the second sensing boundary 31*b*', and intersection points 36*a*', 36*b*'. This embodiment differs in that the sensing boundaries 31*a*, 31*b*' are substantially parallel to one another and to the direction of travel of the combine 10 (FIG. 1), as indicated by arrow 45 in FIG. 5. Otherwise, the arrangement is configured in substantially the same way as described herein, so is not repeated for the sake of brevity.

Figure 6:
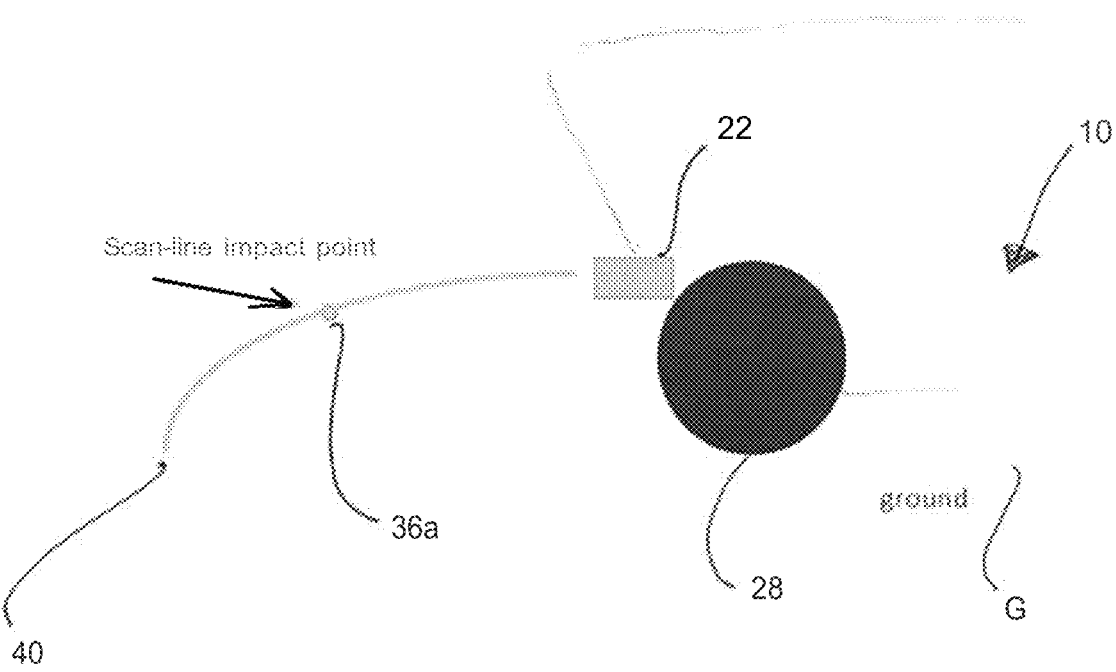
FIG. 6 is a schematic view illustrating aspects of the present invention.

FIG. 6 illustrates an extension of the present invention, and specifically how the arrangements discussed herein may be used to infer a "landing location" 40 of the residue material on the ground surface G. As discussed, both the first and second LIDAR units 30*a*, 30*b* each provide a two-dimensional sensing region defining respective first and second sensing boundaries 31*a*, 31*b*. Advantageously, utilising LIDAR units it is possible to identify the location within that two-dimensional region at which the residue material impacts the sensing boundary. With knowledge of this position, along with, for example, knowledge of the forward speed of the combine 10, operational parameters of the spreader tool 22 (e.g. a rotational speed of the first and/or second rotors 23*a*, 23*b*), relative position of the spreader tool 22 with respect to the sensing boundaries 31*a*, 31*b*, wind conditions, etc. it is possible for the processor 104 to map a trajectory of the residue material based on the impact point 36*a* of the residue material with the sensing boundary. Advantageously, performing this determination for substantially all of the interactions between residue material and the first and second sensing boundaries 31*a*, 31*b* it is possible to determine a full distribution of the residue material on the ground G, beyond identifying the relative skewness of the observed distribution as described above. This may provide further control over the residue distribution and ultimately lead to a more uniform spreading of residue material on the ground, providing that is desired by the operator.

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as set out herein and a machine readable storage storing such a program. Still further, embodiments of the present invention may be conveyed electronically via any medium such as a communication signal carried over a wired or wireless connection and embodiments suitably encompass the same.

It will be appreciated that the above embodiments are discussed by way of example only. Various changes and modifications can be made without departing from the scope of the present application.

The invention claimed is:

1. A system for monitoring the distribution of residue material from a spreader tool of an agricultural machine, the system comprising:
  a first LIDAR sensor having a two-dimensional sensing region defining a first two-dimensional sensing boundary corresponding to a first direction with respect to the agricultural machine, the first two-dimensional sensing boundary comprising a first vertical plane relative to a ground surface;
  a second LIDAR sensor having a two-dimensional sensing region defining a second two-dimensional sensing boundary corresponding to a second direction with respect to the agricultural machine, the second two-dimensional sensing boundary comprising a second vertical plane relative to the ground surface; and
  at least one controller, configured to:
    receive data from the first LIDAR sensor indicative of a measure of residue material crossing the first sensing boundary;
    receive data from the second LIDAR sensor indicative of a measure of residue material crossing the second sensing boundary;
    determine, from the data received from the first and second LIDAR sensors, a distribution of residue material associated with the spreader tool; and
    output at least one control signal for controlling at least one operational system of the agricultural machine in dependence on the determined distribution.

2. The system of claim 1, wherein at least one of the first sensing boundary or the second sensing boundary is parallel to the direction of travel of the agricultural machine, in use.

3. The system of claim 2, wherein the first sensing boundary corresponds to a left hand edge of the agricultural machine, and the second sensing boundary corresponds to a right hand edge of the agricultural machine.

4. The system of claim 1, wherein at least one of the first sensing boundary or the second sensing boundary is angled with respect to the direction of travel of the agricultural machine, with the first and second sensing boundaries intersecting at a point or line of intersection positioned centrally with respect to a lateral axis of the agricultural machine.

5. The system of claim 1, wherein:
  the first sensing boundary corresponds to a left hand side of the agricultural machine;
  the second sensing boundary corresponds to a right hand side of the agricultural machine; and
  the system monitors a relative distribution of residue from the spreader tool.

6. The system of claim 5, wherein the relative distribution is determined from the measure of residue material crossing the first and second sensing boundaries, comprising:
  measuring a volume of residue material crossing the sensing boundaries; or
  counting individual crossings of residue material crossing the sensing boundaries.

7. The system of claim 1, wherein the at least one controller is configured to:
  determine a location of at least one of the first sensing boundary or the second sensing boundaries at which residue material has crossed the boundary; and
  based upon the determined location, determine a location within an operating environment of the agricultural machine of the residue material following the spreading operation.

8. The system of claim 1, wherein the at least one operational system of the agricultural machine, controllable by the system comprises a user interface for providing information corresponding to an observed distribution of residue material.

9. The system of claim 1, operable to control at least one operating parameter of the agricultural machine based on an observed distribution of residue material, wherein the at least one operating parameter comprises an operating parameter of the spreader tool.

10. The system of claim 9, wherein the spreader tool comprises a steering mechanism, and the system is operable to control at least one operating parameter of the steering mechanism to control the distribution of residue material from the spreader tool.

11. The system of claim 10, wherein the steering mechanism comprises:
  a first steering unit comprising a first rotor for controlling movement of residue material through and out of the steering mechanism in the first direction; and
  a second steering unit comprising a second rotor for controlling movement of residue material through and out of the steering mechanism in the second direction,
  wherein the system controls operation of at least one of the first rotor or the second rotor to control the distribution of residue material in the first or second directions based on the observed distribution of residue material.

12. An agricultural machine comprising the system of claim 1.

13. A method of monitoring the distribution of residue material from a spreader tool of an agricultural machine, comprising:
  receiving data from a first LIDAR sensor indicative of a measure of residue material crossing a first two-dimensional sensing boundary associated with the first LIDAR sensor, the first two-dimensional sensing boundary comprising a first vertical plane relative to a ground surface;
  receiving data from a second LIDAR sensor indicative of a measure of residue material crossing a second two-dimensional sensing boundary associated with the second LIDAR sensor, the second two-dimensional sensing boundary comprising a second vertical plane relative to the ground surface;
  determining, a distribution of residue material associated with the spreader tool, based on the received data; and
  controlling operation of at least one system of the agricultural machine based on the determined distribution.

* * * * *